US011597664B2

(12) United States Patent
Block et al.

(10) Patent No.: US 11,597,664 B2
(45) Date of Patent: Mar. 7, 2023

(54) DISINFECTION METHOD FOR WATER AND WASTEWATER (71) Applicant: EVONIK OPERATIONS GMBH, Essen (DE)

(72) Inventors: Philip Block, Garnet Valley, PA (US); Weidong An, Williamsville, PA (US); Angela Thompson, East Amherst, NY (US); Coryn Mittiga, Tonawanda, NY (US)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 16/194,559

(22) Filed: Nov. 19, 2018

(65) Prior Publication Data

US 2019/0152817 A1    May 23, 2019

Related U.S. Application Data (60) Provisional application No. 62/588,514, filed on Nov. 20, 2017.

(51) Int. Cl.
| *C02F 1/68* | (2006.01) |
| *C02F 1/72* | (2023.01) |
| *C02F 1/50* | (2023.01) |
| *C02F 103/02* | (2006.01) |
| *C02F 103/00* | (2006.01) |

(52) U.S. Cl.
CPC .............. *C02F 1/722* (2013.01); *C02F 1/505* (2013.01); *C02F 1/68* (2013.01); *C02F 1/725* (2013.01); *C02F 1/688* (2013.01); *C02F 2103/001* (2013.01); *C02F 2103/02* (2013.01); *C02F 2303/04* (2013.01)

(58) Field of Classification Search
CPC .. C02F 1/505; C02F 1/68; C02F 1/688; C02F 1/722; C02F 1/725; C02F 2103/001; C02F 2103/02; C02F 2103/04
See application file for complete search history.

(56) References Cited

U.S. PATENT DOCUMENTS

| 4,763,678 A | * | 8/1988 | Ott ........................ A61B 1/123 134/104.2 |
| 5,019,516 A | * | 5/1991 | Wiese ................ G01N 33/1813 436/171 |
| 5,439,663 A | | 8/1995 | Manganaro et al. |

(Continued)

FOREIGN PATENT DOCUMENTS

| CN | 105884100 A | * | 8/2016 |
| CN | 105906112 A | * | 8/2016 |

(Continued)

OTHER PUBLICATIONS

Machine translation of WO 2009147328 A2 (2009) (obtained from Google Patents Sep. 2020) (Year: 2009).*

(Continued)

*Primary Examiner* — Chester T Barry
(74) *Attorney, Agent, or Firm* — Law Office of: Michael A. Sanzo, LLC (57) ABSTRACT

Provided herein are methods and compositions for water disinfection. The methods and compositions, which can include a peracid and a source of copper ions, are useful for treatment of water contaminated with recalcitrant microbes.

20 Claims, 4 Drawing Sheets

(56) References Cited

U.S. PATENT DOCUMENTS

| | | | |
|---|---|---|---|
| 5,632,676 A | 5/1997 | Kursclmer et al. | |
| 5,705,078 A * | 1/1998 | Kurek | C02F 1/725 210/759 |
| 5,849,985 A | 12/1998 | Tieckelmann et al. | |
| 5,879,653 A | 3/1999 | Castrantas et al. | |
| 5,977,403 A | 11/1999 | Byers | |
| 6,277,414 B1 | 8/2001 | Elhaik et al. | |
| 6,365,099 B1 | 4/2002 | Castrantas et al. | |
| 6,660,289 B1 | 12/2003 | Wilmotte et al. | |
| 6,828,294 B2 | 12/2004 | Kellar et al. | |
| 7,347,647 B2 | 3/2008 | Seech et al. | |
| 7,416,718 B2 | 8/2008 | Sethi et al. | |
| 7,473,372 B2 | 1/2009 | Block et al. | |
| 7,510,721 B2 | 3/2009 | Roden et al. | |
| 7,524,141 B2 | 4/2009 | Sethi et al. | |
| 7,547,430 B2 | 6/2009 | Sethi et al. | |
| 7,576,254 B2 | 8/2009 | Block et al. | |
| 7,666,315 B2 | 2/2010 | Lopez Martinez et al. | |
| 7,785,038 B2 | 8/2010 | Block et al. | |
| 7,947,745 B1 | 5/2011 | Laramay et al. | |
| 7,998,446 B2 | 8/2011 | Pfeffer et al. | |
| 8,029,693 B2 | 10/2011 | Dada et al. | |
| 8,084,411 B2 | 12/2011 | Tichy et al. | |
| 8,454,890 B2 | 6/2013 | Rovison, Jr. et al. | |
| 8,486,366 B2 | 7/2013 | Pfeffer et al. | |
| 8,575,075 B2 | 11/2013 | Huang et al. | |
| 8,877,149 B2 | 11/2014 | Pfeffer et al. | |
| 9,005,669 B2 | 4/2015 | Allen et al. | |
| 9,018,142 B2 | 4/2015 | Rovison, Jr. et al. | |
| 9,063,046 B1 * | 6/2015 | Sagripanti | C12N 1/005 |
| 9,114,357 B2 | 8/2015 | Block et al. | |
| 9,295,744 B2 | 3/2016 | Rovison et al. | |
| 9,351,488 B2 | 5/2016 | Rovison et al. | |
| 9,375,768 B2 | 6/2016 | Pisanova et al. | |
| 9,617,170 B2 * | 4/2017 | Karpova | C02F 1/32 |
| 9,656,890 B2 | 5/2017 | Block | |
| 9,821,353 B2 | 11/2017 | Pisanova et al. | |
| 9,849,203 B2 | 12/2017 | Rovison, Jr. et al. | |
| 10,344,199 B2 | 7/2019 | Pisanova et al. | |
| 10,625,655 B2 | 4/2020 | Rovison, Jr. et al. | |
| 2003/0080467 A1 * | 5/2003 | Andrews | C02F 1/78 264/275 |
| 2003/0235623 A1 | 12/2003 | Van Oosterom | |
| 2005/0126599 A1 * | 6/2005 | Labib | B08B 9/0327 134/22.11 |
| 2006/0169649 A1 | 8/2006 | Hsueh et al. | |
| 2007/0051640 A1 * | 3/2007 | Bellamy | C02F 1/4674 205/742 |
| 2007/0163210 A1 * | 7/2007 | Glasbey | A61L 12/023 53/425 |
| 2008/0226541 A1 | 9/2008 | Zhou et al. | |
| 2009/0039035 A1 | 2/2009 | Whitekettle et al. | |
| 2009/0181107 A1 * | 7/2009 | Buckley | C02F 1/4674 424/661 |
| 2011/0111053 A1 * | 5/2011 | Huddersman | C02F 1/722 424/616 |
| 2011/0117209 A1 * | 5/2011 | Letartre | C11D 3/48 424/616 |
| 2011/0123642 A1 | 5/2011 | Wilmotte | |
| 2014/0228328 A1 | 8/2014 | Rovison et al. | |
| 2015/0005379 A1 | 1/2015 | Block et al. | |
| 2015/0141301 A1 | 5/2015 | Rovison, Jr. et al. | |
| 2015/0218437 A1 | 8/2015 | Rovison, Jr. et al. | |
| 2015/0239738 A1 | 8/2015 | Zhou et al. | |
| 2015/0258589 A1 | 9/2015 | Seech | |
| 2016/0286800 A1 | 10/2016 | Dagher et al. | |
| 2016/0289102 A1 | 10/2016 | Morita | |
| 2016/0345576 A1 | 12/2016 | Rovison et al. | |
| 2017/0020130 A1 * | 1/2017 | Buschmann | A01N 59/00 |
| 2017/0313604 A1 | 11/2017 | Garibi et al. | |
| 2018/0065874 A1 | 3/2018 | Au et al. | |
| 2018/0103638 A1 | 4/2018 | Puente de Vera et al. | |
| 2018/0117198 A1 | 5/2018 | Rovison, Jr. et al. | |
| 2018/0265375 A1 * | 9/2018 | Sarathy | A61L 2/24 |
| 2018/0271090 A1 | 9/2018 | Rovison et al. | |
| 2018/0360060 A1 | 12/2018 | Pisanova et al. | |
| 2019/0135669 A1 * | 5/2019 | Cort | C12N 1/20 |
| 2019/0144313 A1 | 5/2019 | Block et al. | |
| 2019/0152817 A1 | 5/2019 | Block et al. | |
| 2019/0248679 A1 | 8/2019 | Rovison, Jr. et al. | |
| 2019/0364892 A1 | 12/2019 | An et al. | |
| 2019/0380337 A1 | 12/2019 | Mittiga et al. | |
| 2019/0388574 A1 | 12/2019 | An et al. | |
| 2020/0238887 A1 | 7/2020 | Rovison, Jr. et al. | |
| 2020/0352165 A1 | 11/2020 | Puente de Vera et al. | |
| 2021/0337804 A1 * | 11/2021 | Roeder | A01N 25/10 |

FOREIGN PATENT DOCUMENTS

| | | | |
|---|---|---|---|
| JP | 53063760 A * | 6/1978 | |
| WO | 1996018301 | 6/1996 | |
| WO | WO-2009147328 A2 * | 12/2009 | A01N 59/20 |
| WO | 2012025943 | 3/2012 | |
| WO | 2015039225 | 3/2015 | |

OTHER PUBLICATIONS

De Souza, et al., Water and Wastewater Disinfection with Peracetic Acid and UV Radiation and Using Advanced Oxidation Process PAA/UV, Internatl. J. Photoenergy, vol. 2015, Article ID 860845, 7 pages (Year: 2015).*

Machine Translation of description portion of CN 105884100A (Year: 2021).*

Machine Translation of description portion of CN105906112A (Year: 2021).*

Sagripanti et al., Comparative Sporicidal Effects of Liquid Chemical Agents, Appl. and Environ. Microbio., vol. 62 No. 2, Feb. 1996, p. 545-551 (Year: 1996).*

V. M. Luna-Pabello et al., Effectiveness of the Use of Ag, Cu, and PAA to disinfect municipal wastewater, Environmental Technology, vol. 30 No. 2, Feb. 2009, pp. 129-139 (Year: 2009).*

Ma T. Orta de Velasquez, Adding silver and copper to hydrogen peroxide and peracetic acid in the disinfection of an advanced primary treatment effluent, Environmental Technology, vol. 29 (2008), pp. 1209-1217 (Year: 2008).*

International Search Report and Written Opinion issued on Jun. 4, 2019 in corresponding PCT Application No. PCT/US2018/061746.

International Preliminary Report on Patentability for corresponding PCT application PCT/US2018/061746 filed Nov. 19, 2018.

English language translation of WO 2009/147328 obtained using the EPO translate program.

U.S. Appl. No. 16/009,936, filed Jun. 15, 2018, US-2018-0360060 A1, dated Dec. 20, 2018, Pisanova.

U.S. Appl. No. 16/191,757, filed Nov. 15, 2018, US-2019-0144313 A1, May 16, 2019, Block.

U.S. Appl. No. 16/275,894, filed Feb. 14, 2019, US-2019-0248679 A1, Aug. 15, 2019, Rovison.

U.S. Appl. No. 16/428,216, filed May 31, 2019, US-2019-0364892 A1, Dec. 5, 2019, An.

U.S. Appl. No. 16/448,542, filed Jun. 21, 2019, US-2019-0388574 A1, Dec. 26, 2019, An.

U.S. Appl. No. 16/777,057, filed Jan. 30, 2020, US-2020-0238887 A1, Jul. 30, 2020, Rovison.

U.S. Appl. No. 16/936,663, filed Jul. 23, 2020, US-2020-0352165 A1, Nov. 12, 2020, Puente de Vera.

U.S. Appl. No. 17/253,953, filed Dec. 18, 2020, Mittiga.

* cited by examiner

DISINFECTION METHOD FOR WATER AND WASTEWATER

CROSS REFERENCE TO RELATED APPLICATIONS

This application claims priority under 35 U.S.C. § 119(e)(1) from U.S. Provisional Application Ser. No. 62/588,514, filed Nov. 20, 2017, the contents of which are incorporated herein by reference.

FIELD OF THE INVENTION

The present invention relates to a method of water disinfection, for example, wastewater, by contacting the water with a combination of a peracid, such as peracetic acid (PAA), and a source of copper ions.

BACKGROUND OF THE INVENTION

The treatment of water and wastewater, including household sewage and runoff, typically involves a multistep process to reduce physical, chemical and biological contaminants to acceptable limits, before such water or wastewater can be safely returned to the environment. Among the steps typically employed in a water treatment facility is a disinfection step, in which the water or wastewater is treated to reduce the levels of microorganisms present in the water or wastewater. Standard disinfection methods typically involve treatment with chlorine or chlorinated compounds, ozone, or ultraviolet light. Standard methods are not always effective for the rapid elimination of recalcitrant microorganisms, for example, Enterococci. There is a continuing need for methods of elimination of recalcitrant microorganisms in a timely and cost-effective manner.

SUMMARY OF THE INVENTION

Provided herein are materials and methods for water disinfection. The water can be drinking water, industrial wastewater, municipal wastewater, combined sewer overflow, process water, rain water, flood water, and storm runoff water. The method can include adding a peracid and source of copper ions to the water and maintaining the contact of the water with the peracid and the copper ions for a time sufficient to reduce the concentration of microorganisms in the water. In some embodiments, the source of copper ions can be a copper salt. In some embodiments, the source of copper ions can be copper metal. In some embodiments the water has previously undergone primary or secondary purification treatment.

BRIEF DESCRIPTION OF THE DRAWINGS

These and other features and advantages of the present invention will be more fully disclosed in, or rendered obvious by, the following detailed description of the preferred embodiment of the invention, which is to be considered together with the accompanying drawings wherein like numbers refer to like parts and further wherein.

DETAILED DESCRIPTION

The treatment of water and wastewater so that it can be safely returned to the environment typically involves a number of processes to remove physical, chemical and biological contaminants. In general, sewage effluent is first mechanically screened at a regulated flow to remove large objects such as sticks, packaging cans, glass, sand, stones and the like which could possibly damage or clog the treatment plant if permitted to enter. The screened wastewater is then typically sent through a series of settling tanks, where sludge settles to the bottom, while grease and oils rise to the surface. After the sludge is removed and the surface materials skimmed off, the wastewater is typically treated with microorganisms to degrade any organic contaminants. This biological treatment ultimately produces a floc, that is, an aggregate of fine suspended particles, which is typically removed by filtration through sand or activated carbon. In the final stages of treatment, the microorganism content of the filtered water is reduced by disinfecting methods. A disinfectant can be added to the wastewater stream. The mixture of disinfectant and wastewater is passed through a disinfectant contact chamber. Contact of the wastewater with the disinfectant is typically maintained for a sufficient period of time to reduce the microorganism level to the desired extent.

In most water treatment plants, chlorine or chlorinated compounds are employed as the disinfectant. Ozone and ultraviolet light treatments are also used. The use of peracids has also been proposed.

U.S. federal and state regulatory agencies rely upon the use of microbial indicator organisms in routine monitoring of water disinfection. Because it is impractical to test water for every potential waterborne pathogen, regulatory agencies have determined that the reduction in levels of such indicator organisms provides a surrogate measure for reduction of pathogens in general, particularly those found in human and animal excretia. Fecal coliforms were one of the first bacterial indicator organisms used to assess microbial reduction. *Escherichia coli* has become the predominant indicator organism in many states throughout the U.S. More recently, many states have adopted the use of *Enterococcus faecalis* as an indicator organism. *Enterococcus faecalis* is more difficult to inactivate than *E. coli* and thus is a more conservative indicator with respect to public safety. The use of bacteriophage, that is, viruses that infect pathogenic bacteria, as indicator organisms is also currently under consideration by the United States Environmental Protection Agency.

As the indicator organisms used to demonstrate suitable reductions in microbial concentrations become more challenging to inactivate, increased concentrations of the disinfectant, such as peracetic acid, sodium hypochlorite or chloramines, or incorporation of longer contact times may be needed to achieved the desired log reduction in the concentration of the indicator organism. However, this strategy may be impractical due to both technical constraints, for example the configuration of the disinfection contact basin, and economic constraints due to the increased costs of using higher concentrations of disinfectant.

Typical contact times for the water and the disinfectant, for example, chlorine, at wastewater treatment plants can range from about twenty minutes to about an hour. These short content times may be effective for inactivation of many species of bacteria and viruses. However, they may be less effective for the treatment of more recalcitrant microbes, for example, *E. faecalis* or bacteriophage.

The inventors have found that treatment of microorganism-containing water with a peracid, such as peracetic acid, along with a source of copper ions resulted in increased efficacy against microbial indicator organisms. More specifically, the combination of peracetic acid and copper ions provided a substantial reduction in the levels of indicator organisms at lower concentrations of peracetic acid and at shorter contact times.

Useful peracids for the methods disclosed herein are peracetic acid (peroxyacetic acid or PAA) or performic acid, or a combination of thereof. Peracetic acid is typically used as an aqueous equilibrium mixture of acetic acid, hydrogen peroxide, peracetic acid and water. The weight ratios of these compounds can vary depending upon the particular grade of PAA employed. Exemplary PAA solutions are those having the typical weight ratios of PAA:hydrogen peroxide: acetic acid from 12-18:21-24:5-20; 15:10:36; 15:10:35; 35:10:15; 20-23:5-10:30-45 and 35:10:15.

Other organic peracids (also called peroxyacids) suitable for use in the methods disclosed herein include one or more $C_1$ to $C_{12}$ peroxycarboxylic acids, such as monocarboxylic peracids and dicarboxylic peracids. These peracids can be used individually or in combinations of two, three or more peracids. The peroxycaboxylic acid can be a $C_2$ to $C_5$ peroxycarboxylic acid, such as a moncarboxylic peracid or dicarboxylic peracid. The peracid should be at least partially water-soluble or water-miscible.

One suitable category of organic peracids includes peracids of a lower organic aliphatic monocarboxylic acid having 1-5 carbon atoms, such as formic acid, acetic acid ethanoic acid), propionic acid propanoic acid), butyric acid (butanoic acid), iso-butyric acid (2-methyl-propanoic acid), valeric acid (pentanoic acid), 2-methyl-butanoic acid, iso-valeric acid (3-methyl-butanoic) and 2,2-dimethyl-propanoic acid. Organic aliphatic peracids having 2 or 3 carbon atoms, e.g., peracetic acid and peroxypropanoic acid, are also suitable.

Another category of suitable lower organic peracids includes peracids of a dicarboxylic acid having 2-5 carbon atoms, such as oxalic acid (ethanedioic acid), malonic acid (propanedioic acid), succinic acid (butanedioic acid), maleic acid (cis-butenedioic acid) and glutaric acid (pentanedioic acid).

Peracids having between 6-12 carbon atoms that can be used in the methods disclosed herein include peracids of monocarboxylic aliphatic acids such as caproic acid (hexanoic acid), enanthic acid (heptanoic acid), caprylic acid (octanoic acid), pelargonic acid (nonanoic acid), capric acid (decanoic acid) and lauric acid (dodecanoic acid), as well as peracids of monocarboxylic and dicarboxylic aromatic acids such as benzoic acid, salicylic acid and phthalic acid (benzene-1,2-dicarboxylic acid).

The source of copper ions can be a copper containing salt, for example, copper sulfate, copper chloride, or copper nitrate. The copper salt can be a solid, that is, a crystal or a powder, or an aqueous solution of the copper salt. Alternatively, the source of copper ions can be a solid, for example, a copper mesh, copper foil or copper rod. The copper ions can be either in the +1 or +2 valence state.

The peracid and the source of copper ions can be added to the water to be treated from separate stocks or stock solutions. The peracid, for example, peracetic acid, and the source of copper ions can be added to the water to be treated either simultaneously or sequentially. In some embodiments, the source of copper ions can be added to the water before the peracid is added. Alternatively, the source of copper ions can be added to the water after the peracid is added. In some embodiments, the water or wastewater can be a water or wastewater stream. When the peracid and the source of copper ions are added sequentially, the time between the additions of the two components can vary depending upon many factors including the configuration of the treatment facility. For example, the addition of the first component, either peracetic acid or the source of copper ions, and the addition of the second component, either the source of copper ions or peracetic acid, can be separated by a time of about 20 seconds to about 60 minutes or more.

The source of copper ions and the peracid can be added to the stream simultaneously, either at the same application point or a different application point. The location of the addition point of the source of copper ions relative to the peracid addition point can be adjusted spatially to achieve a desired interval between addition of the two chemicals in order to optimize the antimicrobial activity. The order of addition can also take into account water or wastewater flowrates and the hydraulics associated with the specific disinfection contact chamber.

When the source of copper ions is solid copper, for example, a copper mesh, copper foil or copper rod, the copper can be positioned in close proximity to the PAA addition point so that the PAA passes over or around the copper metal. For example, the PAA can pass directly through a copper mesh. In some embodiments, the water or wastewater stream can be configured such that one or more copper meshes, copper foils, or copper rods can be placed downstream of the PAA addition point. In some embodiments, the solid copper can be a copper alloy. Exemplary alloys include bronze (copper alloy with zinc) and brass (copper alloyed with tin). Alloys can also contain one or more of aluminum, nickel, manganese, or silicon.

The peracid can be added to the water to be treated in concentrations that effectively reduce the levels of the population of microorganisms in the water sample. The optimum concentration will depend upon many factors, including, for example, the level of microorganisms in the water, the species of microorganisms in the water; the degree of disinfection desired; the time for which the wastewater treated remains in the contact chamber; the presence of other materials in the water, and the water temperature.

In general, when the peracid employed is PAA, the total amount of PAA added should be sufficient to ensure that a concentration of between 0.5 and 50 parts per million by weight ("ppm") of PAA, for example, of between 1 ppm and 30 ppm of PAA, is present in the wastewater to be treated.

The copper ions can be added in concentrations that effectively increase the antimicrobial activity of the peracid. The optimum concentration will depend on many factors, including, for example, the level of microorganisms in the water; the species of microorganisms in the water; the time for which the water and wastewater will remain in contact with the copper ions and the peracid, and the amount of peracid added to the water or wastewater. In general, the amount of copper to be added should not exceed levels that would be significantly toxic to aquatic wildlife following the release of the treated water from the treatment facility.

In general, the total amount of copper added should be sufficient to I provide a concentration between 0.01 and 5 parts per million by weight ("ppm") of copper ion in the water to be treated.

If copper is used in the form of a solid metal, for example, a copper mesh, foil or rod, then the configuration and positioning of the a copper mesh, foil or rod should be sufficient to contact the peracid and produce the desired antimicrobial activity. For copper meshes, the mesh size can vary to allow ease of water flow through or over the mesh without significant pressure drop across the mesh. The size and thickness of the mesh, foil or rods should be sufficient to allow adequate flow of the water around, over or through the copper and be made of enough copper material as to allow for a period of use prior to replacement.

The length of time that the water or wastewater is contacted with the peracid and the source of copper ions can vary. Contact times can range from about five minutes to about two hours, for example, about 5 minutes, about 10 minutes, about 15 minutes, about 20 minutes, about 25 minutes, about 30 minutes, about 35 minutes, about 40 minutes, about 45 minutes, about 50 minutes, about 55 minutes, about 60 minutes, about 65 minutes, about 70 minutes, about 75 minutes, about 80 minutes, about 85 minutes, about 90 minutes, about 100 minutes, about 110 minutes, about 120 minutes, about 130 minutes, about 140 minutes, about 150 minutes, about 160 minutes, about 170 minutes, about 180 minutes.

The treated water or wastewater can be released from the treatment facility at the end of the contacting step. In some embodiments, additional steps can be included prior to release of the treated water or wastewater. The additional steps can include contacting the water with a quencher to quench the activity of the PAA. Alternatively or in addition, the treated water can be passed through additional filters to remove any remaining particulate matter.

Methods of determining the concentration of a microorganism in water can vary depending upon many factors including, for example, the species of microorganism, the source and purity of the water, and the time constraints involved. Exemplary methods include culturing methods, such as plate counts; biochemical methods such as adenosine triphosphate detection or measurement of nutrient indicators; nucleic acid analysis, for example, polymerase chain reaction based methods; immunological methods, for example, antibody-based detection of microbial markers; and optical methods. Regardless of the method, the reduction of the concentration of microorganisms is typically assayed on a logarithmic scale. For example, a three log reduction in the number of colony forming units present in a sample would result in 1000 times fewer colony forming units in the sample.

EXAMPLES

Example 1: Treatment of *E. coli* with PAA and Copper (II)

A bench scale test was performed using a non-disinfected, secondary effluent sample from a wastewater treatment facility. The wastewater sample was collected and shipped to the laboratory, and testing was conducted within twenty-four hours. The wastewater sample was split into 100 mL aliquots and placed into clean, disinfected glass jars and placed on a jar-stirrer apparatus. The wastewater aliquots were inoculated with *E. coli* to achieve a target concentration of 320,000 MPN (most probable number)/100 mL (5.5 log).

A sufficient amount of an aqueous stock solution of copper sulfate (Sigma-Aldrich) was added to the water to provide final concentrations of copper ion of 0.05 mg/L, 0.1 mg/L or 0.3 mg/L. Immediately following the addition of the copper sulfate (that is, within about 10 seconds) a peracetic acid (PAA) equilibrium solution (15% peracetic acid/23% hydrogen peroxide) was added to the water, with stirring, to provide a final concentration of 0.5 ppm. Control samples included: 1) samples that contained 1) PAA but no copper; 2) copper but no PAA; 3) no PAA or copper.

At 15, 30 and 45 minutes after the PAA and the copper were added to the water, samples were removed and neutralized with sodium bisulfate to decompose the PAA and stop the microbial inactivation. *E. coli* levels in the water samples were determined using IDEXX Colisure™ according to the supplier's directions.

Figure 1:
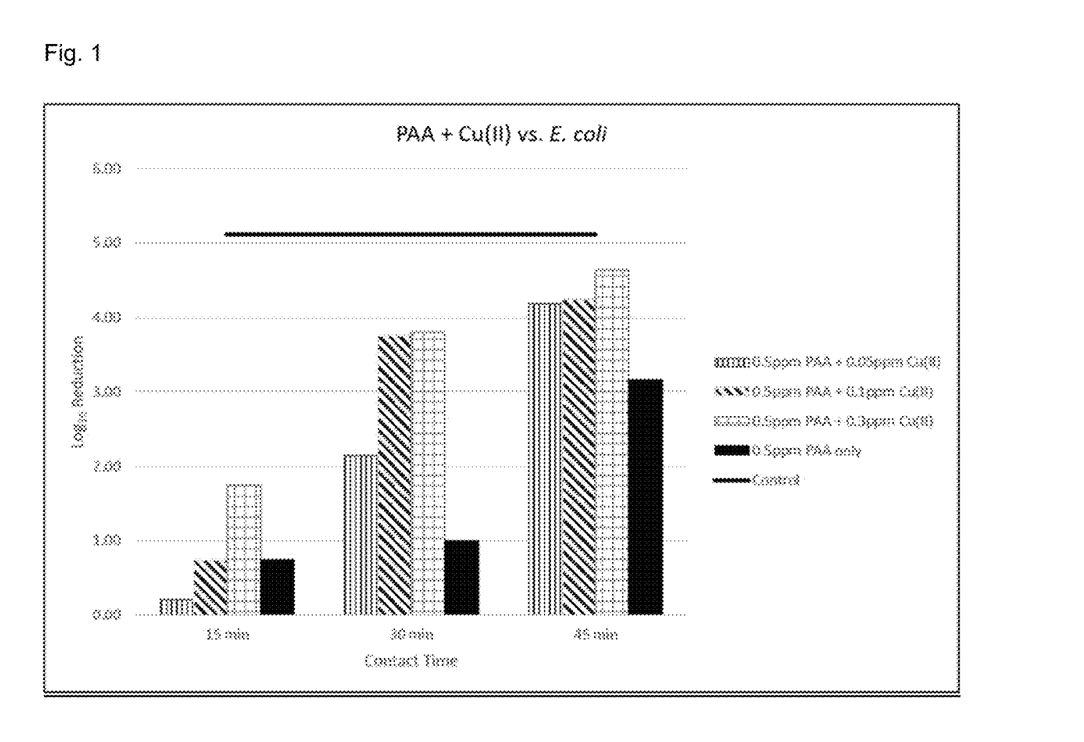
FIG. 1 is a graph showing the log reduction of *Escherichia coli* (*E. coli*) as a function of time at a PAA concentration of 0.5 mg/L and copper ion concentrations of 0.05 ppm, 0.1 ppm, and 0.3 ppm

The effect of PAA and copper on the reduction of *E. coli* as a function of contact time is shown in FIG. 1. As shown in FIG. 1, the combination of copper (II) and PAA resulted in a dose-dependent and time-dependent increase in the microbial log reduction by one to three additional log units compared to samples containing PAA alone (represented by the black bars in FIG. 1). In addition, this significant increase was seen for even the shortest contact time of 15 minutes. These data showed that the antimicrobial activity of low concentrations of PAA against the microbial indicator organism, *E. coli*, was substantially increased by the addition of copper (II).

Example 2: Treatment of Enterococci with PAA and Copper (II)

A bench scale test was performed using a non-disinfected, secondary effluent sample from a wastewater treatment facility. The wastewater sample was collected and shipped to the laboratory, and testing was conducted within twenty-four hours. The wastewater sample was split into 100 mL aliquots and placed into clean, disinfected glass jars and placed on a jar-stirrer apparatus. The wastewater aliquots were inoculated with Enterococci to achieve a target concentration of 320,000 MPN/100 mL (5.5 log).

A peracetic acid (PAA) equilibrium solution was added to the water to provide a final concentration of 0.5 ppm. Following the addition of the PAA, a source of copper ions (+2) was added to the water in the form of copper sulfate to provide final concentrations of copper ions of 0.1 mg/L or 0.3 mg/L. Control samples included: 1) samples that contained 1) PAA but no copper; 2) copper but no PAA; 3) no PAA or copper.

At 15, 30 and 45 minutes after the PAA and the copper were added to the water, samples were removed and neutralized with sodium bisulfate to decompose the PAA and stop the microbial inactivation. Enterococci levels were determined using IDEXX Enterolert™ according to the supplier's directions.

Figure 2:
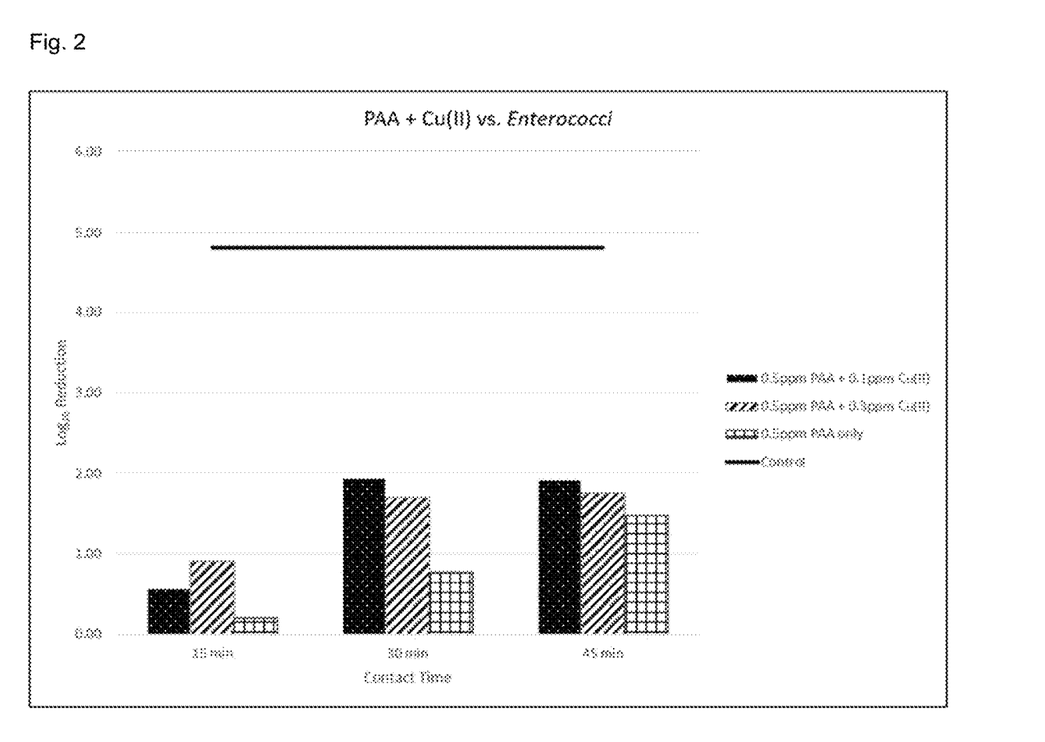
FIG. 2 is a graph showing the log reduction of Enterococci as a function of time at a PAA concentration of 0.5 mg/L and copper ion concentrations of 0.1 ppm and 0.3 ppm.

The effect of PAA and copper on the reduction of Enterococci as a function of contact time is shown in FIG. 2. As shown in FIG. 2, the combination of copper (II) and PAA resulted in a dose-dependent and time-dependent increase in the microbial log reduction by one to two additional log units compared to samples containing PAA alone (represented by the checkered bars in FIG. 2). In addition, this significant increase was seen for even the shortest contact time of 15 minutes. These data showed that the antimicrobial activity of low concentrations of PAA against the microbial indicator organism, *Enterococcus*, was substantially increased by the addition of copper (II).

Example 3: Treatment of MS2 Bacteriophage with Peracetic Acid and Copper (II)

A bench scale test was performed using a non-disinfected, secondary effluent sample from a wastewater treatment facility. The wastewater sample was collected and shipped to the laboratory, and testing was conducted within twenty-four hours. The wastewater sample was split into 100 mL aliquots and placed into clean, disinfected glass jars and placed on a jar-stirrer apparatus. The wastewater aliquots were inoculated with MS2 bacteriophage to achieve a target concentration of 320,000 MPN/100 mL (5.5 log).

A peracetic acid (PAA) equilibrium solution was added to the water to provide a final concentration of 5 ppm. Following the addition of the PAA, a source of copper ions (+2) was added to the water in the form of copper sulfate to provide final concentrations of copper ions of 1 ppm. Control samples included: 1) samples that contained 1) PAA but no copper; 2) copper but no PAA; 3) no PAA or copper.

At 45, 90 and 180 minutes after the PAA and the copper were added to the water, samples were removed and neutralized with sodium bisulfate to decompose the PAA and stop the microbial inactivation. MS2 bacteriophage levels in the water samples were determined using a double agar layer assay with *E. coli* host.

Figure 3:
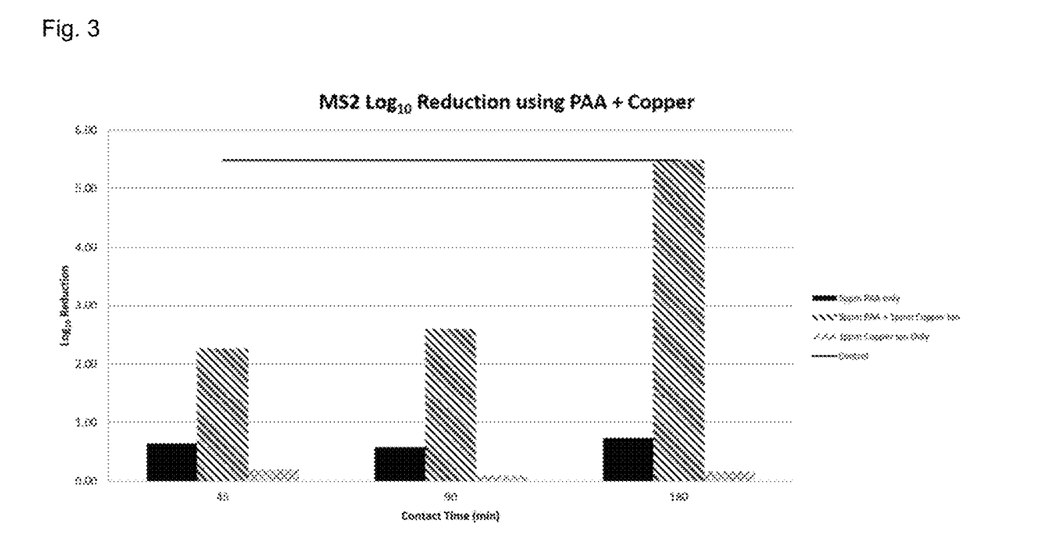
FIG. 3 is a graph showing the log reduction of MS2 bacteriophage as a function of time at a PAA concentration of 5 mg/L and a copper ion concentration of 1 ppm.

The effect of PAA and copper ion on the reduction of MS2 bacteriophage as a function of dose contact time is shown in FIG. 3. As shown in FIG. 3, the combination of ions and PAA resulted in a dose-dependent and time-dependent increase in the microbial log reduction by two to five additional log units compared to samples containing PAA alone (represented by the black bars in FIG. 3). In addition, this substantial increase was seen at the shortest contact time of 45 minutes. These data showed that the antimicrobial activity of low concentrations of PAA against the MS2 bacteriophage was substantially increased by the addition of copper ions.

Example 4: Treatment of MS2 Bacteriophage with Peracetic Acid and Copper Mesh

A bench scale test was performed using a non-disinfected, secondary effluent sample from a wastewater treatment facility. The wastewater sample was collected and shipped to the laboratory, and testing was conducted within twenty-four hours. The wastewater sample was split into 100 mL aliquots and placed into clean, disinfected glass jars and placed on a jar-stirrer apparatus. The wastewater aliquots were inoculated with MS2 bacteriophage to achieve a target concentration of 320,000 MPN/100 mL (5.5 log).

A peracetic acid (PAA) equilibrium solution was added to the water to provide final concentrations of 1 ppm, 2 ppm, 3 ppm, or 5 ppm. Approximately 5 g of copper mesh (100×100 mesh count commercially pure copper mesh, 0.0022; weave: 48"×36" (12 SF min) opening 0.0078", open area 60.8%, 0.040 lb/SF) was added to each of the glass jars.

At 5, 10, 20, 45, 90 and 180 minutes after the PAA and the copper mesh were added to the water, samples were removed and neutralized with sodium bisulfate to decompose the PAA and stop the microbial inactivation. MS2 bacteriophage levels were determined using a using double agar layer assay with an *E. coli* host.

Figure 4:
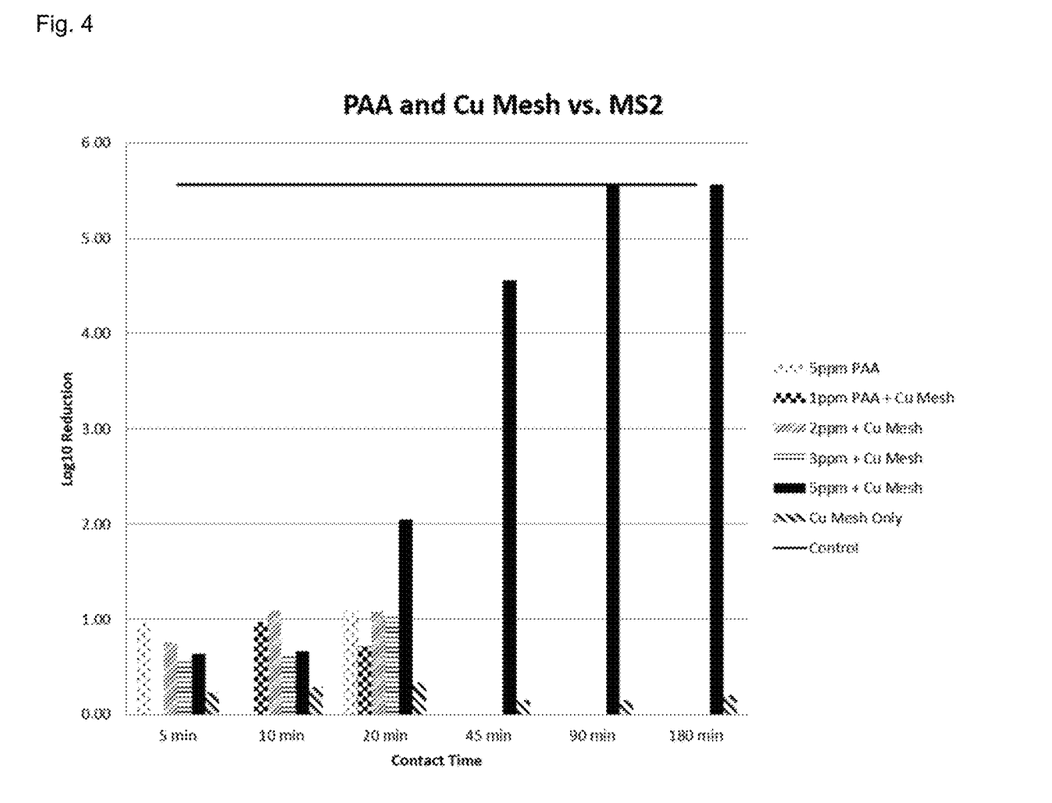
FIG. 4 is a graph showing the log reduction of MS2 bacteriophage as a function of time at PAA concentrations of 1, 2, 3 and 5 mg/L and copper mesh.

The effect of PAA and copper mesh on the reduction of MS2 bacteriophage is shown in FIG. 4. As shown in FIG. 4, the combination of copper mesh and PAA resulted in a time-dependent increase in the microbial log reduction as compared to samples containing PAA alone. At concentrations of 5 ppm PPA there was a substantial reduction of MS2 bacteriophage levels after 20 minutes of contact time and a complete reduction of MS2 bacteriophage after 90 minutes of contact time. These data showed that the antimicrobial activity of low concentrations against MS2 bacteriophage was substantially increased by the addition of copper mesh as a source of copper ions.

What is claimed is:

1. A method of reducing the concentration of microorganisms in water by the combined effect of one or more peracids and one or more water-soluble copper-containing salts, wherein the method consists of:
    a) adding the one or more peracids (or an aqueous solution of the one or more peracids) and the one or more water-soluble copper-containing salts to the water to a final concentration of 0.1 ppm to 20 ppm peracid and 0.01 to 10 ppm copper ions; wherein:
        i) the water is selected from the group consisting of: sewage, industrial wastewater, municipal wastewater, combined sewer overflow, process water, rain water, flood water, and storm runoff water; and
        ii) the one or more peracids and the one or more water-soluble copper-containing salts are added together in a single solution;
    b) maintaining contact between the water, the one or more peracids and the copper ions for a time sufficient to reduce the concentration of microorganisms in the water.

2. The method of claim 1, wherein, in step b), contact between the water, the one or more peracids and the copper ions is maintained for 5-180 minutes.

3. The method of claim 1, wherein, in step b), contact between the water, the one or more peracids and the copper ions is maintained for 5-90 minutes.

4. The method of claim 1, wherein, in step b), contact between the water, the one or more peracids and the copper ions is maintained for 5-45 minutes.

5. The method of claim 1, wherein, in step b), contact between the water, the one or more peracids and the copper ions is maintained for 5-20 minutes.

6. The method of claim 1, wherein, in step b), contact between the water, the one or more peracids and the copper ions is maintained for 5-10 minutes.

7. The method of claim 1, wherein the microorganism is a bacterium, a bacteriophage, a virus, a fungus, a protozoa, a parasite or a microbial indicator organism.

8. The method of claim 1, wherein one of the peracids is peracetic acid or performic acid or a combination thereof.

9. A method of reducing the concentration of microorganisms in water by the combined effect of one or more peracids and one or more water-soluble copper-containing salts, wherein the method consists of:
    a) adding the one or more peracids and the one or more water-soluble copper-containing salts to the water to a final concentration of 0.5 ppm to 50 ppm peracid and a concentration of copper ions effective to increase antimicrobial activity of the peracid; wherein:
        i) the water is selected from the group consisting of: sewage, industrial wastewater, municipal wastewater, combined sewer overflow, process water, rain water, flood water, and storm runoff water; and
        ii) the one or more peracids and the one or more water-soluble copper-containing salts are added together in a single solution;

b) maintaining contact between the water, the one or more peracids and the copper ions for a time sufficient to reduce the concentration of microorganisms in the water.

10. The method of claim 9, wherein the final concentration of the one or more peracids in the water being disinfected is from about 0.5 ppm to about 5 ppm.

11. The method of claim 10, wherein the final concentration of the copper ions in the water being disinfected is from about 0.05 ppm to about 5 ppm.

12. The method of claim 11, wherein one of the peracids is peracetic acid or performic acid and one of the water soluble copper-containing salts is copper sulfate, copper chloride, or copper nitrate.

13. The method of claim 12, wherein the microorganism is a bacterium, a bacteriophage, a virus, a fungus, a protozoa, a parasite or a microbial indicator organism.

14. The method of claim 13, wherein the method results in at least a three log reduction in the number of colony forming units present in a sample of the water.

15. The method of claim 9, wherein a single type of peracid and a single type of copper-containing salt is added to the water.

16. The method of claim 15, wherein the microorganism is a bacterium, a bacteriophage, a virus, a fungus, a protozoa, a parasite or a microbial indicator organism.

17. The method of claim 16, wherein the peracid is peracetic acid or performic acid and the water soluble copper-containing salt is copper sulfate, copper chloride, or copper nitrate.

18. The method of claim 16, wherein, in step b), contact between the water, the peracid and the copper containing ions is maintained for 5-180 minutes.

19. The method of claim 16, wherein, in step b), contact between the water, the peracid and the copper containing ions is maintained for 5-45 minutes.

20. The method of claim 16, wherein, in step b), contact between the water, the peracid and the copper containing ions is maintained for 5-10 minutes.

* * * * *